(12) United States Patent
Purswell et al.

(10) Patent No.: US 8,292,192 B1
(45) Date of Patent: Oct. 23, 2012

(54) VARIABLE STAGE HUMIDITY CONTROL SYSTEM FOR POULTRY HATCHERIES

(75) Inventors: Joseph L. Purswell, Starkville, MS (US); Berry D. Lott, Starkville, MS (US); Matthew Darr, Ames, IA (US)

(73) Assignee: The United States of America as represented by the Secretary of Agriculture, Washington, DC (US)

(*) Notice: Subject to any disclaimer, the term of this patent is extended or adjusted under 35 U.S.C. 154(b) by 746 days.

(21) Appl. No.: 12/471,847

(22) Filed: May 26, 2009

Related U.S. Application Data

(60) Provisional application No. 61/077,385, filed on Jul. 1, 2008.

(51) Int. Cl.
*F24F 3/14* (2006.01)
*C12M 1/36* (2006.01)

(52) U.S. Cl. .................. 236/44 C; 435/286.1

(58) Field of Classification Search .......... 62/91; 236/3, 236/44 C, 44 B; 251/129.15; 435/286.1
See application file for complete search history.

(56) References Cited

U.S. PATENT DOCUMENTS

| | | | | |
|---|---|---|---|---|
| 2,137,996 | A * | 11/1938 | Crawford | 165/223 |
| 3,216,215 | A | 11/1965 | Schulett | |
| 4,526,011 | A * | 7/1985 | Logan et al. | 62/176.1 |
| 4,572,427 | A | 2/1986 | Selfridge et al. | |
| 5,792,427 | A | 8/1998 | Hugh et al. | |
| 6,182,608 | B1 | 2/2001 | Cannon | |
| 2005/0211195 | A1 * | 9/2005 | Sundholm | 123/25 A |
| 2008/0120335 | A1 * | 5/2008 | Dolgoff | 707/104.1 |

* cited by examiner

*Primary Examiner* — Chen Wen Jiang
(74) *Attorney, Agent, or Firm* — John Fado; Robert D. Jones; Lesley Shaw

(57) ABSTRACT

The automated humidity control system controls the humidity within a setter hall. The system continuously monitors the existing setter hall thermal conditions and electronically compares the existing conditions to computerized data describing the targeted conditions. The system then takes action to conform the existing condition to the targeted condition.

15 Claims, 8 Drawing Sheets

| Variable | Test Room* | Control Room* |
|---|---|---|
| Air Temperature (°F) | 78.7 ± 1.7 | 78.5 ± 2.6 |
| Relative Humidity (%) | 62.6 ± 7.2 | 42.0 ± 11.5 |
| Dew Point Temperature (°F) | 64.8 ± 4.3 | 52.6 ± 9 |

*Values are mean ± standard deviation

VARIABLE STAGE HUMIDITY CONTROL SYSTEM FOR POULTRY HATCHERIES

CROSS REFERENCE TO RELATED APPLICATIONS AND CLAIM TO PRIORITY

This is a non-provisional patent application claiming priority to associated provisional patent application 61/077,385 filed Jul. 1, 2008, which is hereby incorporated by reference. The current application claims priority to the associated provisional application under 35 U.S.C. 120.

FIELD OF THE INVENTION

The current invention relates to an environmental control system for poultry hatcheries (i.e. setter halls). Specifically, the invention relates to an automated system for stabilizing and optimizing setter hall humidity and temperature as well as corresponding oxygen, and carbon dioxide levels.

BACKGROUND OF THE INVENTION

Controlling the thermal environment in poultry incubators is critically important to hatchery production. Humidity plays an important role in embryonic development during incubation. The humidity of the air in the incubator regulates water loss from the egg and affects the hatchability of the egg, as well as the body weight and the overall quality of the chick.

Current humidity control methods are based on a simple "bang-off" control system. The use of this type of system results in highly variable humidity and air temperature. When humidity drops below a predetermined threshold, water is added via misting nozzles. The system ceases misting when an upper humidity threshold is exceeded. A drop in air temperature occurs as the water mist is evaporated, thus air temperature is susceptible to variation as well.

The need exists for an improved humidity control system that enables hatcheries to more precisely control environmental conditions in the incubator during embryonic development. The current invention provides an automated system that optimizes the environmental conditions within an incubator based on the dew point of the incubator air rather than on humidity alone. The current invention ensures a more stable thermal environment within an incubator and results in more consistent and better quality chicks at hatch.

SUMMARY OF THE INVENTION

The current invention is directed to a variable stage incubator humidity control system. At least one incubator is in thermal communication with a spray assembly and a sensor. The sensor senses at least relative humidity and air temperature. A controller is in communication with the sensor and the spray assembly. The controller is structured to calculate an actual dew point and compare the actual dew point with a target dew point. The controller controls the spray assembly to maintain the actual dew point in a pre-programmed range thereby controls conditions in the incubator.

The current invention is also directed to a variable stage setter hall humidity control system. The system comprises a reservoir in fluid communication with a pump. The pump is in fluid communication with at least one solenoid valve. Each solenoid valve is in fluid communication with a corresponding spray line. Multiple nozzles are disposed on each spray line. A controller controls the operation of the variable stage humidity system. The controller is in electrical communication with the pump and the solenoid valves as well as a sensor that senses relative humidity and air temperature.

In operation, the sensor directs relative humidity and air temperature data to the controller. The controller processes the information and directs the pump and the solenoid valves to operate so that fluid flows from the reservoir, through the pump and the solenoid valves, and out the misting nozzles thereby enabling the controller to maintain and control thermal environmental conditions in the setter hall within a pre-programmed hysteresis band.

The current invention further relates to a method of controlling the environmental conditions within a pre-programmed thermal range. A controller and at least one active spray line with misting nozzles is provided. The controller is programmed with a target dew point, time lag, and hysteresis band information. The controller reads the existing temperature and the existing relative humidity in the room in which the system is installed. The controller then calculates the actual dew point in the room based on the existing temperature and relative humidity.

The controller compares the target dew point with the actual dew point so that if the actual dew point is greater than the target dew point plus the hysteresis band, then the controller directs the solenoid valves to reduce the number of active misting spray lines and associated nozzles. If the dew point is less than the target dew point minus the hysteresis band, then the controller directs the solenoid valves to increase the number of active misting spray lines. The system pauses for the amount of time specified by the programmed time lag, and then restarts the process by re-measuring the temperature and relative humidity within the room.

BRIEF DESCRIPTION OF THE DRAWINGS

FIG. 4 is a table showing a summary of test results for a prototype system as described in the current invention, as compared with a control which uses the system and method of the prior art.

DETAILED DESCRIPTION OF THE PREFERRED EMBODIMENTS

In the preferred embodiment, at least one poultry incubator is disposed within a large room known in the art as a "setter hall". Multiple incubators are commonly disposed in a single setter hall. Outside air that has been filtered for contaminants is drawn into the setter hall. The filtered air is then drawn from the setter hall into the individual poultry incubators. The air is circulated through the incubators and vented back into the environment outside the hatchery facility.

Figure 1:
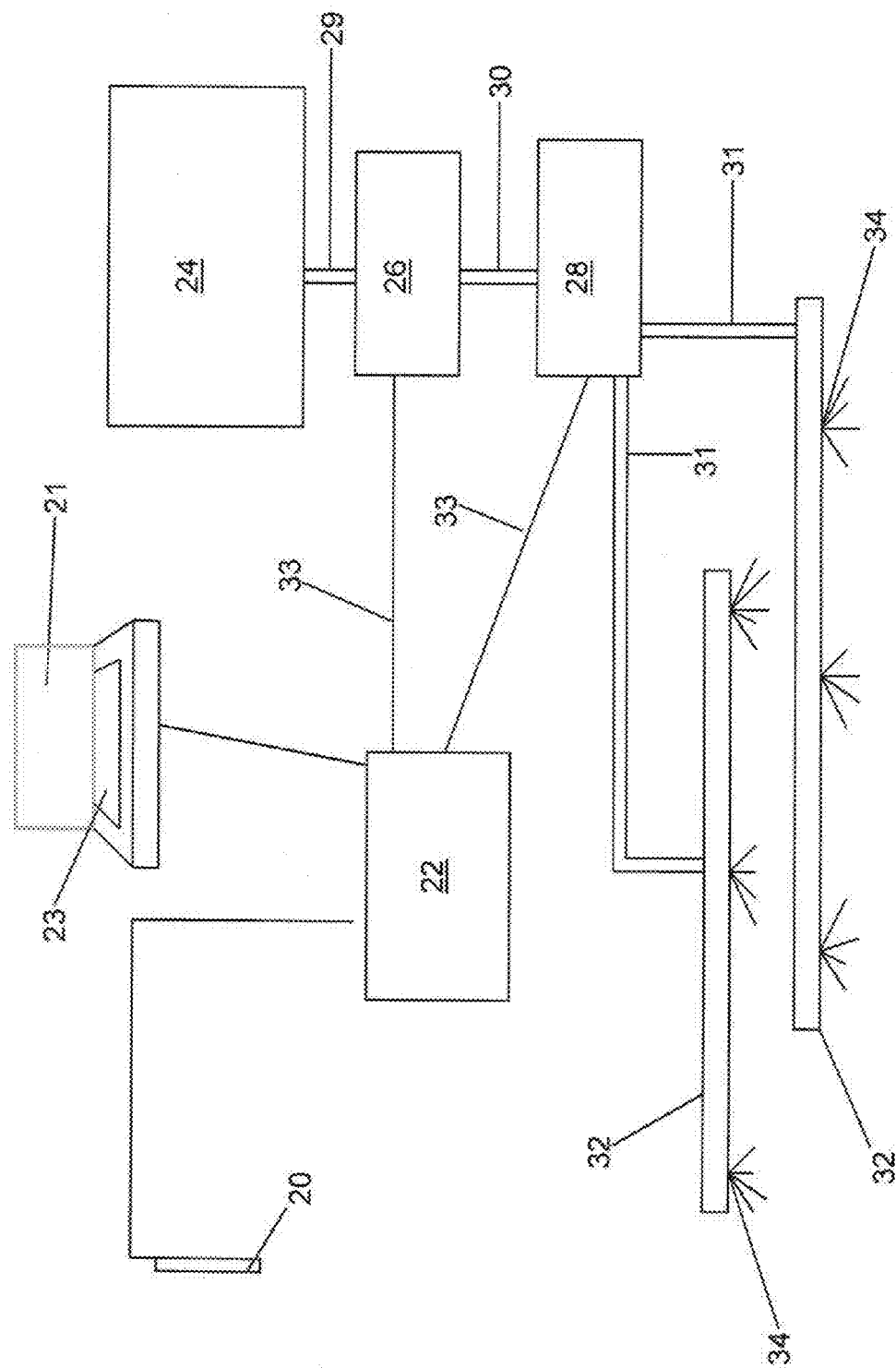
FIG. 1 is a schematic of the current invention.

The current invention seeks to control the thermal environment inside the incubator(s) by controlling the thermal environment within the setter hall. A schematic of the preferred embodiment of the humidity control system is shown in FIG. 1. In the following description, exemplary system components are shown in parenthesis after the more general functional description of each component As shown in FIG. 1, in the preferred embodiment, a combination temperature and relative humidity sensor 20 (HMP50, Vaisala, Helsinki, Finland) is positioned in a setter hall containing poultry incubators. The sensor 20 measures the temperature and relative humidity within the setter hall. The sensor 20 is electronically connected to an embedded controller 22 based on a microcontroller processor (PIC 18F2580). A display 21 (ACS-LCD-128X64, Ackerman Computer Sciences, Sarasota, Fla.) and membrane switch key pad 23 (ACS-LCD-168X64-MBSW, Ackerman Computer Sciences, Sarasota, Fla.) are used to display controller 22 status and setter hall conditions, and input information to the controller 22. In alternative embodiments, additional variables such as air pressure may also be monitored by the sensor to further increase the accuracy of the dew point calculation. Similarly, water pressure in the spray lines may also be monitored and/or controlled to more tightly regulate the amount the rate at which the relative humidity is modified.

The controller 22 is connected to an electric diaphragm pump 26 and an array of solenoid valves 28 with solid state relays 33 (Z10D120, Opto-22, Temecula, Cal.). Fluid flows from a fluid reservoir 24 to the pump 26 via a fluid supply line 29, and from the pump 26 to an array of solenoid valves 28 via a fluid supply line 30. The fluid then flows from the solenoid valves 28 to a plurality of spray lines 32 via a piping network 31. The spray lines 32 include multiple nozzles 34 (3178K61, McMaster-Carr, Chicago, Ill.). In the preferred embodiment, the nozzles 34 are rated at 0.63 gal/h at 40 psi. In alternative embodiments, the nozzles may be of any variety known in the art and the fluid delivery rate and associated pressure may be varied as required for a specific application.

In the preferred embodiment, the spray lines 32 are suspended from the setter hall ceiling, with nozzles 34 equally distributed down the length of the spray line 32. The spray lines 32 may have a varying number of nozzles 34, numbered according to a binary counting scheme (2n), such that the total number of nozzles 34 available is:

$$k=2(2^n-1)$$

where: k=number of nozzles
n=number of spray lines

A large number of nozzles 34 can be controlled by using comparatively few valves 28 while retaining a small increment in staging with this scheme. The system can be scaled to fit design requirements simply by changing the number of spray lines 32 or nozzle type.

Figure 2:
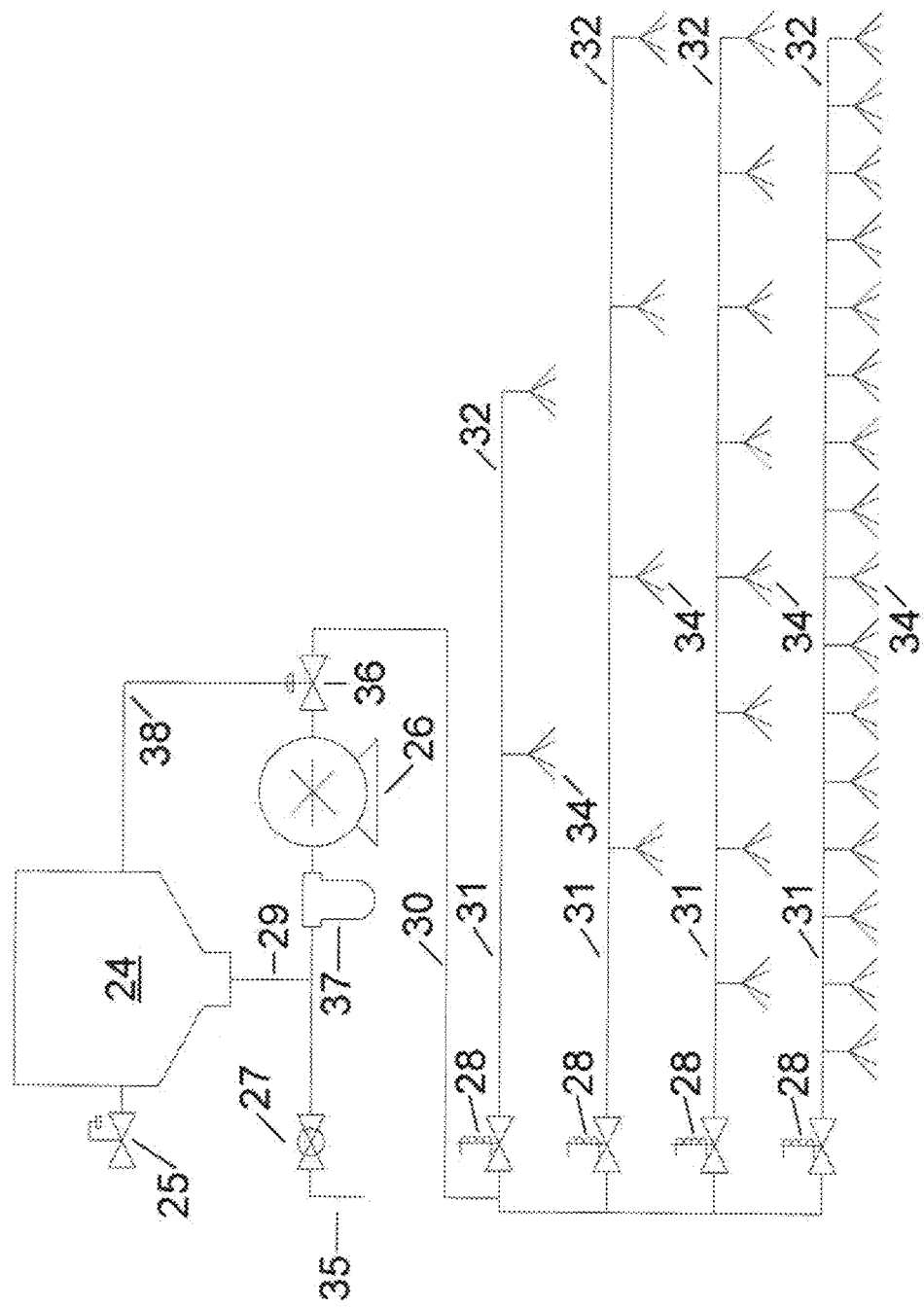
FIG. 2 is a more detailed schematic of the spray delivery system.

A more detailed schematic of the spray delivery system is shown in FIG. 2. In the preferred embodiment, the piping is sized to minimize pressure drop and achieve an even flow rate through each spray nozzle. In the prototype system, three-quarter inch schedule 40 piping provided the best balance between pressure drop and cost—however, rooms of differing dimensions may require other sizes to maintain the proper pressure drop. In alternative embodiments, essentially any dimension and design of pipe should be considered within the scope of the current invention.

As shown in FIG. 2, the fluid reservoir 24 is filled via a fill valve 25. In operation, the fluid travels from the reservoir 24, through a filter 37, and to the pump 26 by means of the supply line 29. A drain valve 27 and associated drain line 35 may be used to drain the reservoir 24 and supply line 29. Pressure from the pump 26 is regulated by a pressure regulator 36. Pressure may be reduced by venting any excess fluid and returning the fluid to the reservoir 24 through a return line 38.

As shown in FIG. 2, after the fluid leaves the pump 26 it is directed through the supply line 30 to an array of solenoid valves 28 configured in parallel. The valves 28 are selectively operated by the controller 22 (see FIG. 1) so that fluid flows through supply lines 31 to the associated spray lines 32 and into the setter hall through one or more nozzles 34, as described supra.

The solenoid valves 28 are opened and closed by the controller 22 based on a control algorithm. The flow chart in FIG. 3 describes the control algorithm of the current invention. As shown in the FIG. 3 flow chart, the controller 22 references a pre-programmed target dew point ($DP_{set}$) for the setter hall room. The controller 22 also references a pre-programmed hysteresis band ($\Delta DP$) which essentially comprises a tolerance range around $DP_{set}$ in which no action will be taken, and a pre-programmed cycle time ($\Delta t$) that defines a time lag between selected system actions. The controller 22 then detects (through the sensor 20, see FIG. 1) the actual temperature $T_{db}$ and relative, humidity (RH) in the setter hall. Based on $T_{db}$ and RH, the controller 22 calculates the actual setter hall dew point (DP).

Figure 3:
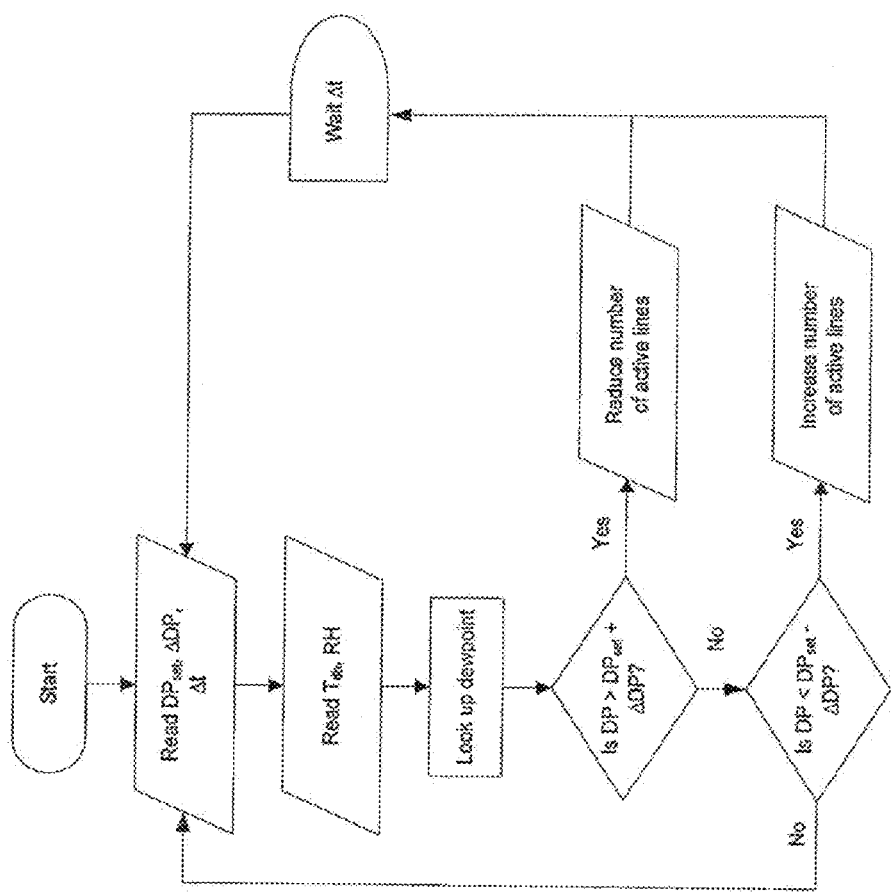
FIG. 3 is a flow chart describing the control algorithm of the current invention.

As shown in the lower portion of the FIG. 3 flow chart, if the actual dew point (DP) is greater than the target dew point ($DP_{set}$) plus the hysteresis band range (ADP), then the number of active spray lines 32 (see FIGS. 1 and 2) are reduced. However, if the actual dew point (DP) is less than the target dew point ($DP_{set}$) minus the hysteresis band range ($\Delta DP$), then the number of active spray lines 32 is increased.

For example, given a target dewpoint of 60° F. with a 2° F. hysteresis band, if the dewpoint were to decrease below 58° F., the number of active spray lines would be increased. After the cycle time, the current dewpoint reading would be compared with the target dew point; an additional spray line would be turned on until the room dewpoint exceeds 62° F., at which point the number of active spray lines would be reduced by the controller to avoid over-humidifying the room air.

A prototype of the current humidity control system was installed in a Test Room in a commercial hatchery and compared with an identical Control Room which served as a control. Air temperature, relative humidity (RH) and dewpoint were recorded in two locations in both rooms using a miniature data logger (DS1923, Dallas Semiconductor, Sunnyvale, Calif.). Tests were conducted between Feb. 20, 2008 and Mar. 4, 2008. Differences between treatments were analyzed with an ANOVA using Microsoft Excel.

Preliminary data analysis shows a reduction in variability (as expressed by standard deviation of mean values) of air temperature and humidity using the prototype system. Mean values and associated standard deviations for air temperature, dewpoint temperature, and relative humidity over the entire test period are shown in the table designated FIG. 4. Time course plots of all variables are shown in FIGS. 5 through 8. Variability was reduced in all three of the tested variable thermal conditions, with reductions of 34.6, 37.4, and 52% for air temperature, relative humidity, and dewpoint temperature, respectively. Differences between means for both the Test Room and Control Room were observed in all three parameters, and were significant in all cases (P<0.0001).

The target relative humidity for each room was set at 60%, and kept within the range of ±5%. With a target RH of 60%, the prototype system maintained the Test Room RH within a 5% range approximately 57% of the test duration as opposed to only 24% for the Control Room.

Figure 5:
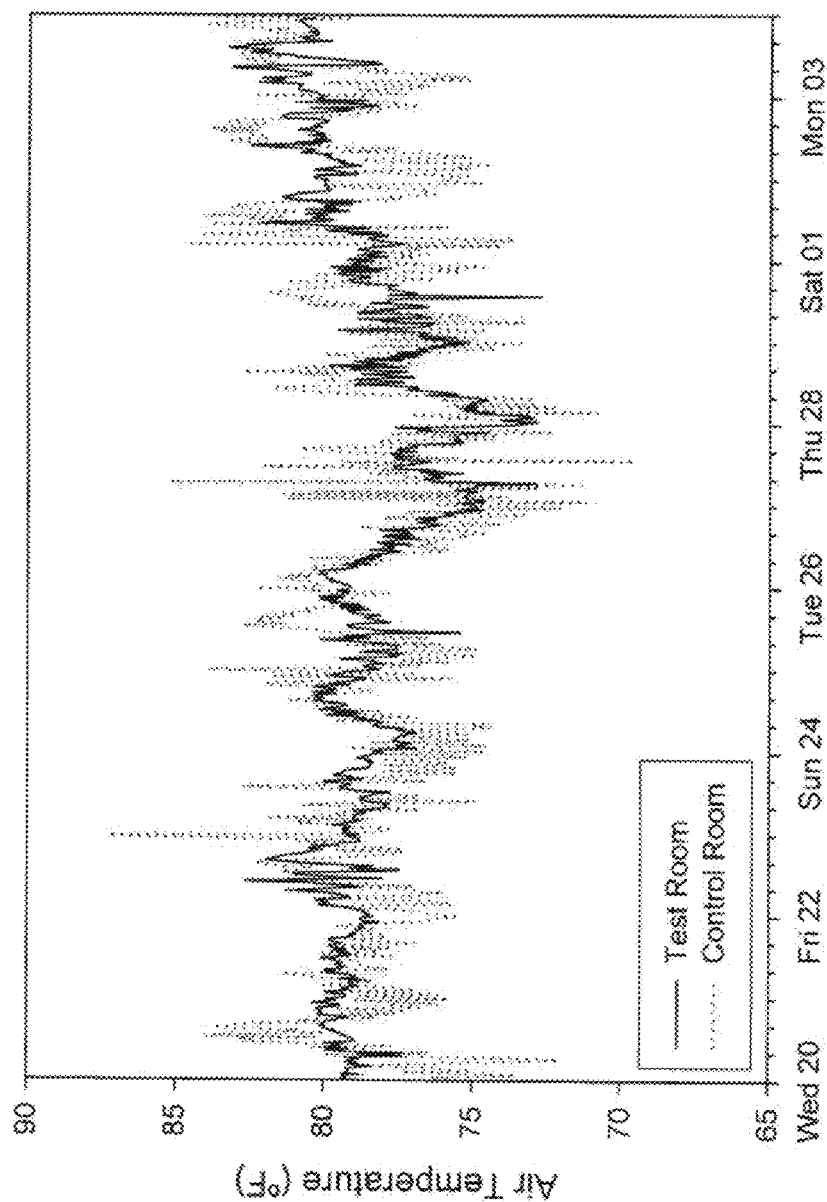
FIG. 5 is a graph showing the variation in air temperature in a Test Room using the current invention, as compared with a Control Room which uses the system and method of the prior art.

In FIG. 5, air temperature is shown on the vertical axis and the test date is shown on the horizontal. The dashed line in FIG. 5 represents the Test Room (i.e. prototype) data and the solid line represents the Control Room data.

Figure 6:
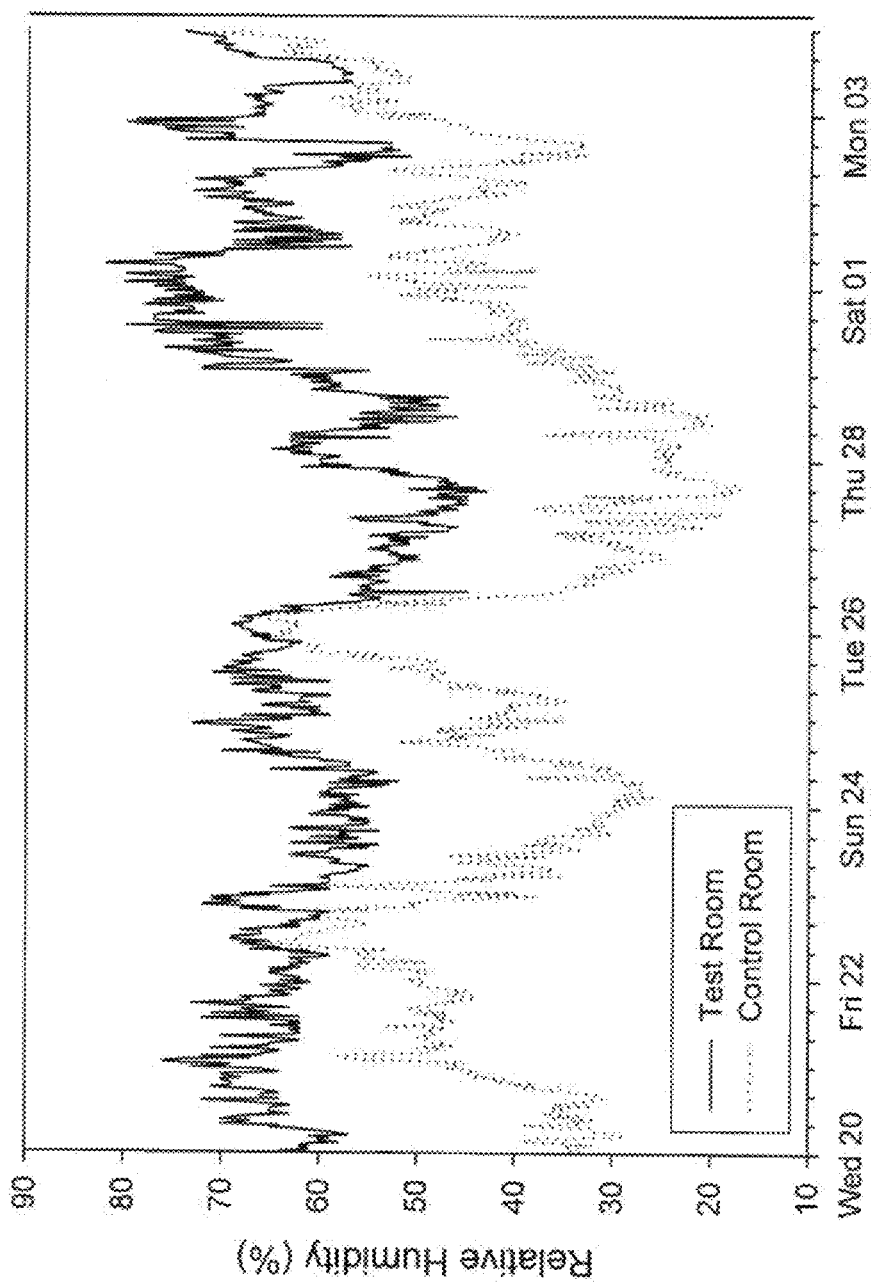
FIG. 6 is a graph showing the variation in relative humidity in a Test Room equipped with a prototype system as described in the current invention, as compared with a Control Room which uses the system and method of the prior art.
Figure 7:
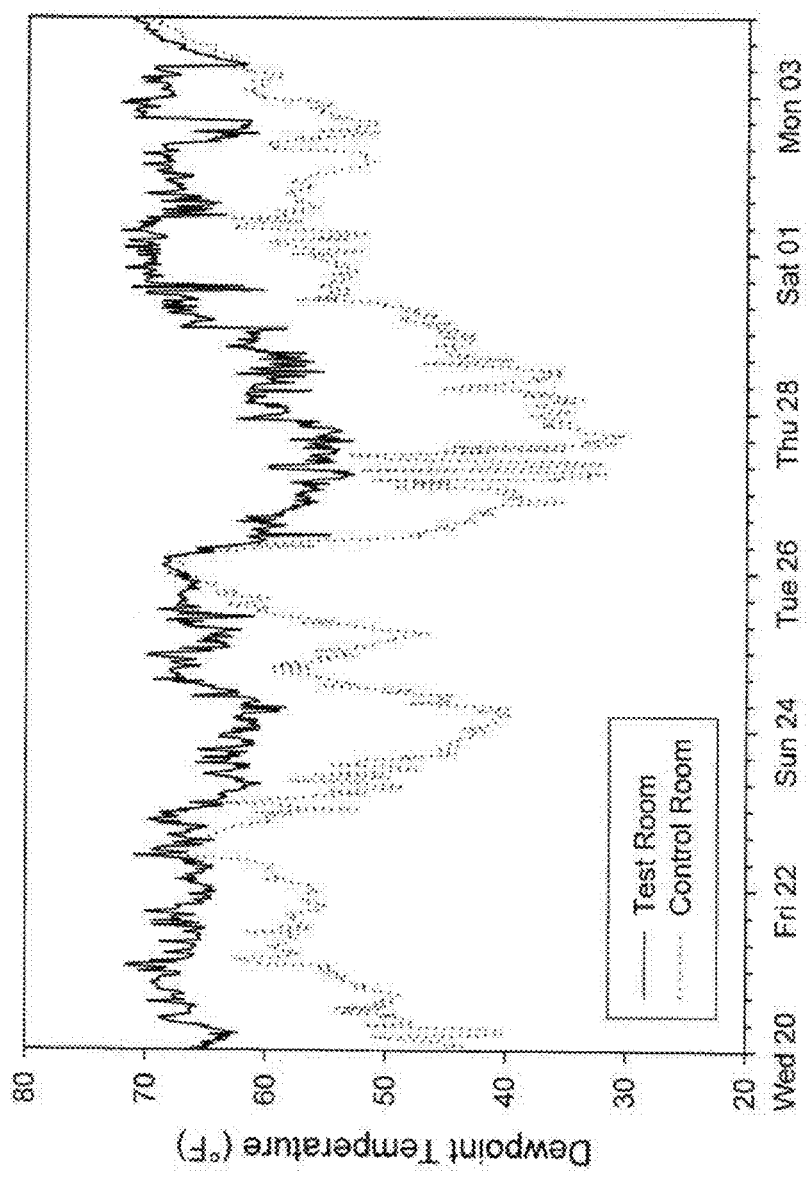
FIG. 7 is a graph showing the variation in dew point temperature in a Test Room equipped with a prototype system as described in the current invention, as compared with a Control Room which uses the system and method of the prior art.

In FIGS. 6 and 7, relative humidity and dew point temperatures are shown on the vertical axis of each of the respective figures, and the test date is shown on the horizontal axis. In both figures, the upper curves represent the data from the Test Rooms and the lower curves represent the data from the Control room.

As shown in FIGS. 5-7, in all cases, the Test Room data shows a much greater consistency than the data from the Control Room.

Figure 8:
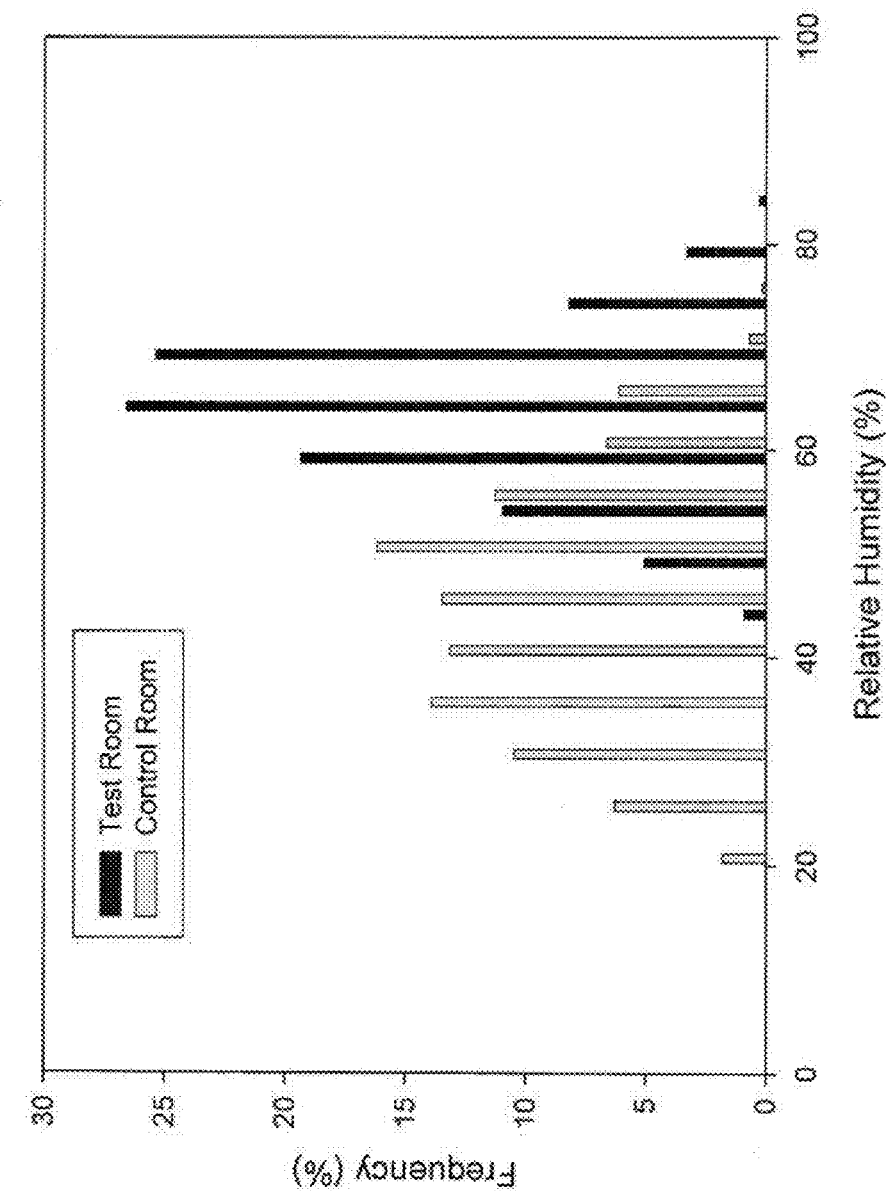
FIG. 8 is a histogram showing the results of a test comparing the data from a Test Room which includes a prototype system as described in the current invention, as compared with a Control Room which uses the system and method of the prior art.

The FIG. 8 histogram analysis also indicates that the relative humidity was maintained in a much narrower range of operation for the prototype system Test Room when compared to the data of the Control Room. Relative humidity in the Test Room ranged from about 47% to about 83%, while the Control Room humidity ranged between about 23% and 88%.

For the foregoing reasons, it is clear that the invention provides an innovative humidity control system that may be used in poultry-related applications as well as applications not directly related to the poultry industry. The invention may be modified in multiple ways and applied in various technological applications. The current invention may be modified and customized as required by a specific operation or application, and the individual components may be modified to achieve a specific desired result. Although the materials of construction are not described, they may include a variety of compositions consistent with the function of the invention. Such variations are not to be regarded as a departure from the spirit and scope of the invention, and all such modifications as would be obvious to one skilled in the art are intended to be included within the scope of the following claims.

We claim:

1. A variable stage incubator humidity control system, the system comprising:
    at least one incubator;
    a spray assembly in thermal communication with the incubator;
    a sensor in thermal communication with the incubator, the sensor sensing at least relative humidity and air temperature; and
    a controller in communication with the sensor and the spray assembly, the controller being structured to calculate an actual dew point and compare the actual dew point with a target dew point, the controller controlling the spray assembly to maintain the actual dew point in a pre-programmed range and to thereby control conditions in the incubator;
    wherein the controller is also structured so that the controller directs fluid to spray lines and nozzles, thereby enabling the nozzles to dispense the fluid, the number of nozzles dispensing fluid is based on an algorithm so that the number of nozzles dispensing fluid is equal to the product of: $2(2^n-1)$, where n is the number of spray lines.

2. The system of claim 1 wherein the incubator, the sensor, and the spray assembly are disposed in a setter hall so that the controller controls the actual dew point in the setter hall.

3. The system of claim 2 wherein the spray assembly comprises:
    a fluid reservoir; and
    a pump in fluid communication with the reservoir and electrical communication with the controller so that the controller controls the pump.

4. The system of claim 3 wherein the spray assembly further comprises at least one solenoid valve in fluid communication with the pump and electrical communication with the controller so that the controller controls the at least one solenoid valve.

5. A variable stage setter hall humidity control system, the system comprising:
    a fluid reservoir;
    a pump in fluid communication with the reservoir;
    at least one solenoid valve, the at least one solenoid valve being in fluid communication with the pump;
    at least one spray line disposed in a setter hall, each of the at least one spray line being in fluid communication with a corresponding one of the at least one solenoid valve;
    a plurality of nozzles, at least one of the plurality of nozzles disposed on each of the at least one spray lines;
    a controller in electrical communication with the pump and the at least one solenoid valve, the controller controlling the pump and the at least one solenoid valve; and,
    a relative humidity and air temperature sensor in electrical communication with the controller;
    wherein the sensor directs relative humidity and air temperature data to the controller, the controller processing the information and directing the pump and the solenoid valves to operate so that fluid flows from the reservoir and through the pump and the solenoid valves and out the nozzles thereby enabling the controller to maintain and control thermal environmental conditions in the setter hall within a pre-programmed hysteresis band, the number of nozzles dispensing fluid is based on an algorithm so that the number of nozzles dispensing fluid is equal to the product of: $2(2^n-1)$, where n is the number of spray lines.

6. The system of claim 5 further comprising an incubator disposed within the setter hall so that the controller maintains and controls thermal environmental conditions in the incubator.

7. The system of claim 6 wherein the controller is structured to calculate actual dew point based on the data provided by the sensor.

8. The system of claim 7 wherein the sensor also senses atmospheric pressure in the setter hall to more accurately calculate the actual dew point in the setter hall.

9. The system of claim 7 wherein the controller further comprises a pre-programmed target dew point, the controller controlling the pump and the at least one solenoid valve to maintain the actual dew point within a dew point range described by the hysteresis band.

10. The system of claim 9 wherein the controller incorporates a time lag between operation of the solenoid valves and calculating an actual dew point.

11. The system of claim 10 further comprising a water pressure sensor in the at least one spray line, the water pressure sensor being in electrical communication with the controller.

12. A method of controlling the environmental conditions in a setter hall within a pre-programmed thermal range, the method comprising the steps of:

providing a plurality of misting spray line assemblies in a setter hall; each spray line assembly comprising a spray line and at least one nozzle, wherein a total number of nozzles dispensing fluid is based on an algorithm so that the number of nozzles dispensing fluid is equal to the product of: $2(2^n-1)$, where n is a total number of spray lines;

controlling each of the misting spray line assemblies with a corresponding solenoid valve;

programming a target dew point, time lag and a hysteresis band into a controller, the controller controlling the at least one solenoid valve;

reading an existing temperature and an existing relative humidity in the setter hall;

directing the controller to calculate an actual dew point based on the existing temperature and relative humidity; and, comparing the target dew point with the actual dew point so that if actual dew point is greater than the target dew point plus the hysteresis band, then the controller directs at least one solenoid valve to reduce fluid flowing to the corresponding misting spray line assembly, and if the dew point is less than the target dew point minus the hysteresis band, then the controller directs at least one of the solenoid valves to increase the fluid flowing to the corresponding misting spray line.

13. The method of claim 12 further comprising the additional step of:

waiting for the amount of time specified by the time lag.

14. The method of claim 13 further comprising the step of restarting the process of claim 12 beginning with the reading step.

15. The method of claim 12 further comprising: before the providing step, placing a poultry incubator in the setter hall.

* * * * *